United States Patent [19]
Hoffert

[11] 3,953,927
[45] May 4, 1976

[54] DRYING COAL IN HOT OIL SLURRY USING RECYCLED STEAM

[75] Inventor: Franklin D. Hoffert, Mountainside, N.J.

[73] Assignee: Hydrocarbon Research, Inc., Morristown, N.J.

[22] Filed: Mar. 24, 1975

[21] Appl. No.: 561,544

[52] U.S. Cl. ........................................... 34/9; 34/17
[51] Int. Cl.² ........................................ F26B 3/00
[58] Field of Search ............................. 34/9, 15, 17

[56] References Cited
UNITED STATES PATENTS

| | | | |
|---|---|---|---|
| 3,007,254 | 11/1961 | Schuster | 34/15 X |
| 3,520,067 | 7/1970 | Winegartner | 34/9 |
| 3,802,090 | 4/1974 | Delhaye et al. | 34/9 |

Primary Examiner—John J. Camby

[57] ABSTRACT

Drying coal having undesirably high moisture content is accomplished by heating the particulate coal in an oil slurry contained in a pressurized drying zone to sufficient temperature to evaporate the moisture. A major portion of the heat required in the drying zone is provided by compressing the hot steam evolved from the coal drying step and condensing it in a heat exchanger passage in the drying zone. The resulting dried coal-oil slurry liquid is then passed on to further processing such as coal hydrogenation or liquefaction steps.

9 Claims, 3 Drawing Figures

DRYING COAL IN HOT OIL SLURRY USING RECYCLED STEAM

BACKGROUND OF THE INVENTION

It is known to dry high moisture-containing coals by heating the coal in a coal-oil slurry form prior to further processing steps such as liquefaction. For example, U.S. Pat. Nos. 3,396,099 to Glinka, 3,519,552 to Hellwig, and 3,680,217 to Chapman disclose drying wet coal to remove moisture by contacting it with hot slurrying oil. Also, 3,520,067 to Winegartner shows such a process for drying wet crushed coal in which the water is vaporized by heating the coal in an oil slurry heated with steam in an elongated vessel, with the resulting water vapor evaporated from the coal being withdrawn off the top of the vessel.

Considerable heat is required in the dryer to evaporate substantially all the moisture from the coal-oil slurry mixture to permit its further processing, such as in a coal liquefaction step, without encountering undesirable operating problems due to its remaining moisture content. Also, it is very desirable to dry such coal under non-oxidizing conditions in order not to oxidize or reduce the heating value of the coal before passing it on to a liquefaction step. Furthermore, it would be desirable to provide such heat to the coal dryer in an efficient manner, such that all or a major portion of the heat available from the vaporized steam is utilized in the process, and the water produced is available for reuse elsewhere in the system.

SUMMARY OF THE INVENTION

This invention pertains to the drying of wet particulate coal by heating it in a hot hydrocarbon liquid slurry form to a temperature sufficient to evaporate the moisture therefrom. A substantial part of the heat required for such coal drying is provided by compressing the low pressure vapor or steam evolved from the hot coal-oil slurry and condensing it in heat exchange with the coal-oil slurry.

The coal, containing at least about four weight percent moisture and usually 5–30 weight percent moisture, is crushed to particle size smaller than about ¼-inch to facilitate moisture removal and preferably to size less than about 4 mesh such as 40 mesh (U.S. Standard Sieve Series). The wet particulate coal is then introduced into a pressurized drying zone containing a bath of hot hydrocarbon liquid provided therein to form a coal-oil slurry. Although any hydrocarbon liquid normally boiling above about 400°F could be used, such slurrying liquid is preferably derived from coal such as by a solvent refining or hydrogenation liquefaction process. Water vapor is evaporated from the coal in the hot slurry liquid in preference to the oil vapor by maintaining selected control of the temperature and pressure conditions in the drying zone to within desired ranges. The liquid coal-oil slurry temperature should be maintained at least about 250°F to provide sufficient evaporative driving force for removing a significant portion of the water vapor from the coal within a reasonable period of time and also to superheat the water vapor (steam) by at least about 5°F and usually by about 10°F–50°F. For best coal drying results, the coal-oil slurry temperature should preferably be maintained between about 300°F to 600°F. The drying zone pressure should be sufficient to retard undesirable evaporation of the hydrocarbon slurrying liquid, and should usually be at least about 15 psig and preferably 50–350 psig pressure.

The vapor evolved from the coal (principally as steam) is withdrawn from the drying zone and compressed to a pressure sufficiently higher than the drying zone pressure in order to effect condensation of the steam at such higher pressure level. The compression ratio for the steam should be at least about 1.3 and usually need not exceed about 3.0. This pressurized vapor is then passed through a fluid passageway located in heat exchange relationship with the coal-oil slurry in the drying zone, so as to assist in heating the slurry to the desired temperature for drying the coal adequately while simultaneously condensing the compressed vapor. The temperature of the condensing vapor should exceed that of the slurry liquid by a mean temperature difference of at least about 5°F, and usually by not more than about 30°F mean $\Delta T$. In this way, a major portion of the heat required in the drying zone for vaporizing the moisture from the coal is provided by the desuperheating and condensing steam which provides a corresponding increase in the thermal efficiency of the overall process.

After such removal of moisture from the coal-oil slurry in the drying zone, the resulting dried slurry liquid is withdrawn from the dryer and passed on to further processing, such as coal hydrogenation or liquefaction steps. The heat transfer from the steam condensation passageway to the coal slurry can be improved by recycling a portion of the dried coal-oil slurry liquid back to the upper portion of the drying zone. Also, additional heat may be provided to the coal-oil slurry liquid in the drying zone as needed by an auxiliary heating fluid, such as externally supplied pressurized steam passed through a separate heat exchange passage. Furthermore, additional heat may be supplied to the dryer by pressurized steam being mixed directly with the recovered and recycled steam.

It is an advantage of this coal-drying process that the coal is dried without any significant contact with air or other oxygen-containing gases. Usually between about 70–80 percent of the total heat needed in the coal drying zone is provided by desuperheating and condensing the compressed recycled steam which is recovered from the wet coal. The remaining heat to the drying zone is supplied by the hot hydrocarbon slurrying liquid provided therein, along with any auxiliary heating fluid such as may be used.

This coal drying process may be used for coals having undesirably high original moisture contents such as Western coals having up to 30 weight percent moisture, or for drying any type coals following a water washing step.

DESCRIPTION OF PREFERRED EMBODIMENT

Figure 1:
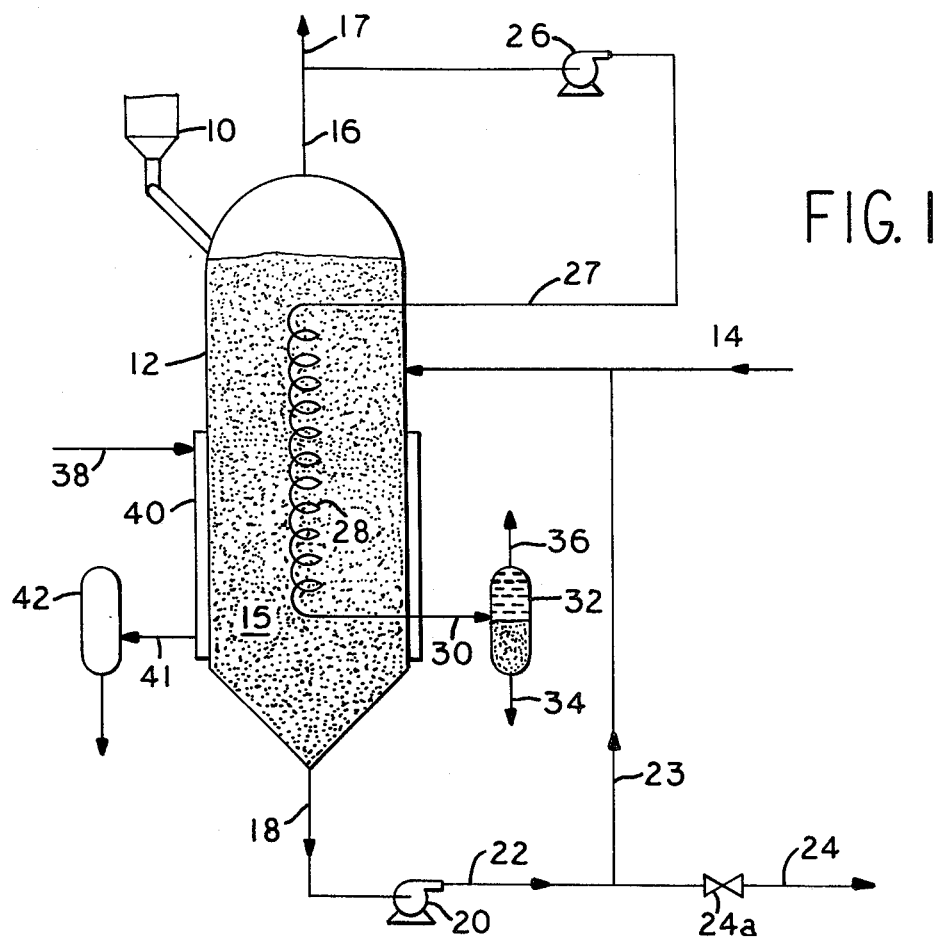
FIG. 1 is a schematic view of a coal drying process employing compression and condensation of the steam evolved to provide a major portion of the heat required in the dryer.

As shown in FIG. 1, wet coal at 10 smaller than ¼ inch and preferably having a particle size range between about 4 to 40 mesh (U.S. Sieve Series) and a moisture content of 5–30 weight percent is introduced into the upper portion of pressurized dryer vessel 12 along with hot slurrying oil at 14. The slurrying oil is at sufficient temperature to heat the resulting coal-oil slurry mixture 15 to at least about 250°F and preferably to about 300–600°F. Under these conditions, substantially all of the moisture in the coal is evaporated and withdrawn as steam at 16. The resulting coal-oil slurry having reduced moisture content below about five weight percent and preferably 1–4 weight percent is withdrawn at 18 from the lower end of dryer 12. The slurry 18 is then pressurized by pump 20 and can be passed as streams 22 and 24 to further processing steps as desired. A portion 23 of this dried coal slurry stream 22 can be advantageously recirculated to the upper end of the dryer 12 to help prevent any substantial solids separation and settling in the slurry mixture 15 and also to promote heat transfer therein from the heating fluid passageway means as described hereinafter. Valve 24a controls the rate of net slurry liquid withdrawal from the dryer 12 so as to maintain the liquid therein at the desired level.

In accordance with this invention, a significant portion of the heat input to coal-oil slurry 15 within dryer 12 is provided by condensation of the steam evaporated from the coal and withdrawn at 16. After venting any undesired portion at 17 such as during start-up, the steam is first compressed by compressor 26 to a pressure sufficiently high so that the steam will condense at a temperature at least 5°F mean ΔT above the temperature of the coal-oil slurry mixture in dryer 12. For practical reasons related to compressor design and amount of heat transfer surface provided, the condensing temperature usually need not be more than about 30°F mean ΔT above the temperature of the coal-oil slurry 15 in dryer 12. By reference to the physical properties of steam, it can be shown that the useful range of the compression ratio for the steam will be in the order of 1.3 to 3.0 to accomplish this result, with the preferred compression ratio range about 1.5 to 2.6. Specifically, when operating the dryer at a temperature of 400°F and a pressure of 150 psig, the steam would be compressed to about 262 psig to permit condensation of steam at 410°F. The corresponding compression ratio for the steam would be 1.68.

The compressed steam at 27 is then passed through fluid passageway 28 located in heat exchange relationship with the coal-oil slurry mixture 15 in dryer 12. The steam is thereby desuperheated and condensed in passageway 28, and the resulting condensate, which usually also contains some oily material, is removed at 30 and passed to separator 32. The condensate containing some oil is removed at 34, while any non-condensible gases are withdrawn at 36.

If necessary, to provide additional heat to slurry body 15, an auxiliary heating fluid 38 may be provided in passageway 40 located in heat transfer relationship with slurry 15 to supplement the heat input into the coal-oil slurry. As shown, such passageway 40 may comprise a jacket surrounding a portion of dryer 12. Such auxiliary heating fluid is preferably condensing steam, and the resulting clean condensate is withdrawn at 41 and can be passed to separator 42. It will be appreciated that by recycling slurry stream 23 back to the dryer 12, the flow velocity past heat exchange passages 28 and 40 will be increased and thereby provide a corresponding increase in the heat transfer coefficients at that point.

As mentioned previously, the temperature of coal-oil slurry 15 should be maintained at least about 250°F and preferably 300° to 600°F for best results in evaporating a high percentage of the moisture from the wet coal feed, but not at a sufficiently high temperature to devolatize the coal to any appreciable extent. Also, the pressure in the dryer should be sufficient to substantially prevent vaporization of the coal-oil slurry, and should usually be at least about 15 psig and preferably about 50–350 psig pressure.

Figure 2:
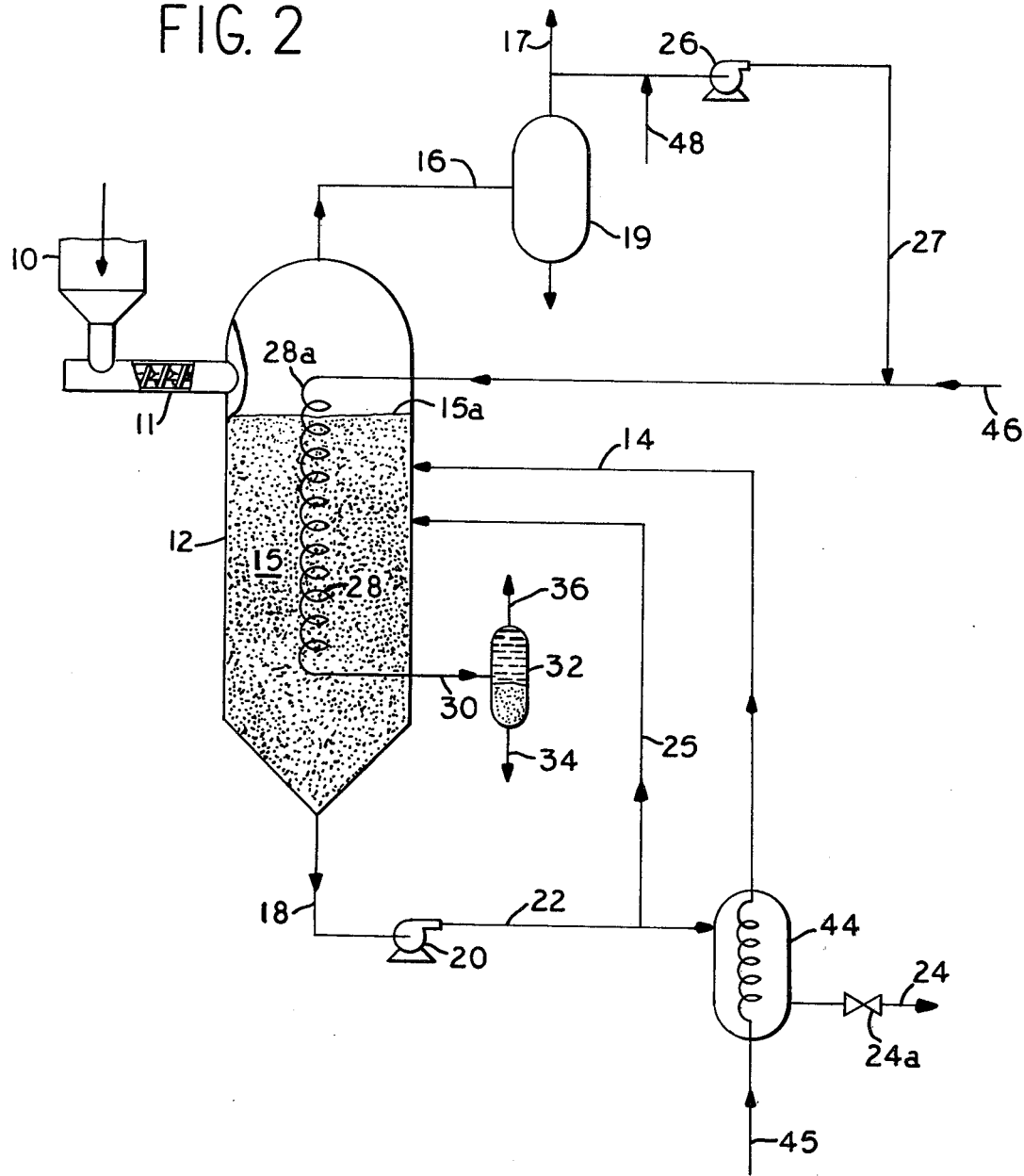
FIG. 2 is a schematic view of an alternative coal drying process wherein coal-oil slurry is heated by supplemental steam, and the dried coal-oil slurry is further heated by the hot slurrying oil.

An alternative coal drying process arrangement is shown by FIG. 2. This process is similar to that shown by FIG. 1, except for certain additional features. The wet particulate coal 10 is introduced by suitable transport means 11 such as lock hopper, screw feeder, rotary star feeder, etc. into the upper portion of dryer vessel 12. The resulting vapor stream withdrawn at 16 is passed to a separation step at 19 for removal of any particulate solids carryover upstream of compressor 26. The coal-oil slurry stream 22 withdrawn from the bottom of the dryer 12 is further heated in heat exchanger 44 by the hot slurrying oil stream 45, which is usually available at a higher temperature than needed in the dryer 12. The heated coal-oil slurry stream 24 is passed on to further processing steps as desired. Control valve 24a is provided to control the net rate of withdrawal of dried coal slurry liquid from the dryer 12 so as to maintain the level of liquid surface 15a at the desired point.

Auxiliary heat can be supplied to the slurry oil 15 as needed by pressurized steam at 46 which is introduced into passageway 28, where the steam is condensed along with recycled pressurized steam 27 to provide the additional heat needed for drying the coal-oil slurry. Steam at 46 should be provided at pressure level at least equal to that of stream 27 from compressor 26, and at temperature at least about 5°F above that of slurry mixture 15. Alternatively or additionally, steam may be provided at 48 to the suction side of compressor 26 for compression therein and to provide heat to the slurry mixture 15 by condensation in passageway 28.

If desired, a portion 25 of coal-slurry stream 22 can be recycled to the dryer but is introduced at a point below that for introducing slurrying oil 14, so as to increase the slurry oil flow velocity in the dryer 12 and thereby promote heat transfer from heat exchange passageway 28 to the slurry as previously mentioned. Furthermore, if necessary to help limit the amount of any foam which may be formed above the slurry body 15, a portion 28a of fluid passageway 28 may be provided above the slurry level 15a. Such hot surface would facilitate the break-up of foam in that upper region of the dryer to prevent foam carryover into stream 16.

Figure 3:
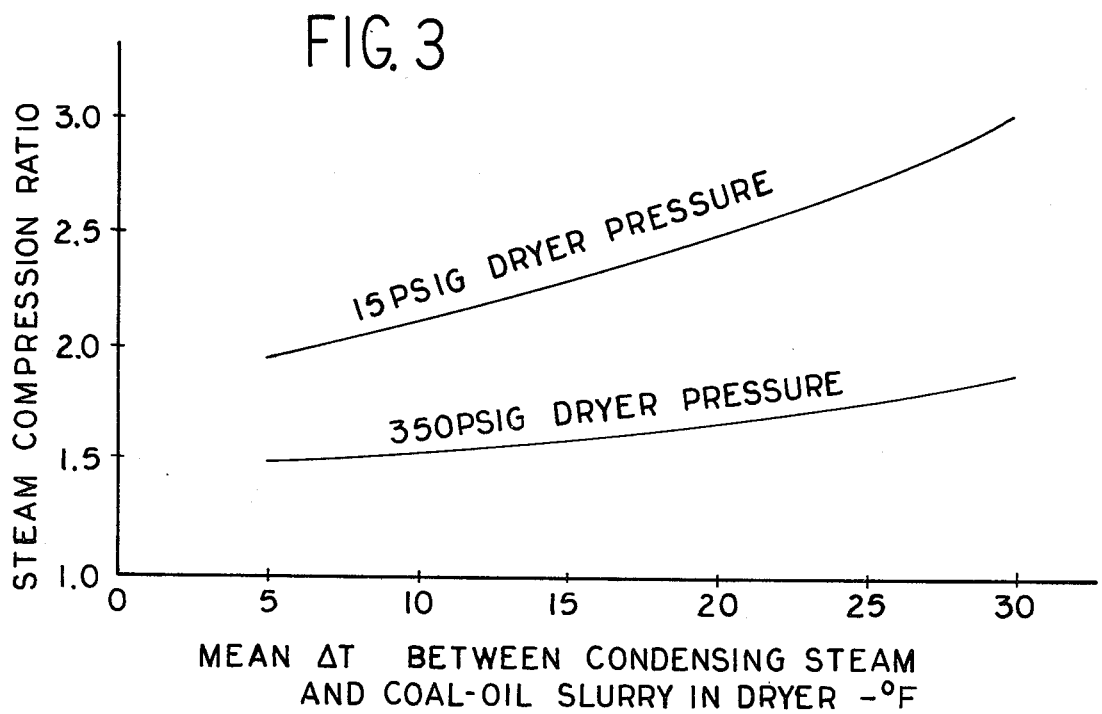
FIG. 3 is a graph showing steam compression ratio vs. mean $\Delta T$ between condensing steam and the coal slurry at various drying pressure.

The general relationship which exists between the steam compression ratio and the mean temperature difference between the condensing steam and slurry in the drying zone for various useful pressure levels is shown in FIG. 3.

By way of further description of my invention, an example of operation is provided in Table 1:

TABLE 1

| | |
|---|---|
| Wet coal temp. to dryer, °F | 150 |
| Slurry oil temp. to dryer, °F | 560 |
| Ratio slurry oil/dry coal feed | 1.75 |
| Dryer Temperature, °F | 400 |
| Dryer Pressure at top, psig | 150 |
| Steam pressure after compression, psig | 294 |
| Steam compression ratio | 1.87 |
| Steam condensing temperature, °F | 420 |
| Condensing steam -- slurry ΔT, °F | 20 |

Although I have disclosed certain preferred embodiments of my process for drying wet particulate coal, I am aware that various modifications may be made thereto and that certain steps disclosed may be employed without others all within the spirit and scope of the disclosure and as defined solely by the appended claims.

I claim:

1. A process for drying moisture-containing coal having at least about 4 weight percent moisture in a coal-oil slurry at above ambient temperature and pressure, comprising the steps of:
   a. introducing the coal into a pressurized drying zone;
   b. introducing hot slurry oil into the drying zone sufficient to form a coal-oil slurry mixture therein;
   c. maintaining the coal-oil slurry temperature at least about 250°F;
   d. withdrawing steam from the drying zone from above the coal-oil slurry level;
   e. compressing the steam and recycling it in indirect heat exchange relationship with the coal-oil slurry so as to heat the slurry while condensing the steam, and
   f. withdrawing the dried coal slurry from the bottom of the drying zone.

2. The process of claim 1 wherein a portion of the dried coal-oil slurry is recirculated to the upper portion of the drying zone to increase the slurry flow velocity therein and improve the heat transfer from the condensing steam to the slurry.

3. The process of claim 1 wherein additional heat is supplied to the coal-oil slurry in the drying zone by additional pressurized steam introduced in indirect heat exchange with the coal-oil slurry.

4. The process of claim 1 wherein additional heat is supplied to the coal-oil slurry in the drying zone by an auxiliary hot fluid introduced into indirect heat exchange relationship with the slurry.

5. The process of claim 1 wherein the drying zone pressure is at least 15 psig and the coal-oil slurry is maintained at 300°–600°F temperature to evaporate moisture from the coal having superheat of at least about 5°F.

6. The process of claim 1 wherein the drying zone pressure is 50 to 350 psig and the steam recovered is compressed to pressure ratio at least about 1.3 higher than the drying zone.

7. The process of claim 1 wherein the hot slurrying oil is used to further heat the dried coal-oil slurry stream before the slurrying oil is introduced into the drying zone.

8. The process of claim 1 wherein additional heat is provided to the coal-oil slurry by additional pressurized steam added to the recycled steam upstream of the compression step.

9. A continuous process for drying wet coal which comprises the steps of:

introducing hot hydrocarbon liquid and wet particulate coal containing about 5 to 30 wt. % water into a drying zone maintained at a pressure of about 50 to 350 psig and a temperature of about 300° to 600°F;

removing water vapor from the drying zone;

compressing the water vapor to obtain at least 5°F. superheat;

introducing the superheat water vapor into the drying zone in indirect heat exchange relationship to the coal and hydrocarbon liquid while condensing the water vapor;

recovering dried coal and hydrocarbon liquid from the drying zone as a slurry.

* * * * *